United States Patent
Pinto et al.

(10) Patent No.: US 10,275,288 B2
(45) Date of Patent: Apr. 30, 2019

(54) VIRTUALIZATION MANAGER FOR RECONFIGURABLE HARDWARE ACCELERATORS

(71) Applicant: Virtual Open Systems, Grenoble (FR)

(72) Inventors: Christian Pinto, Grenoble (FR); Michele Paolino, Grenoble (FR); Salvatore Daniele Raho, Grenoble (FR)

(73) Assignee: Virtual Open Systems, Grenoble (FR)

( * ) Notice: Subject to any disclaimer, the term of this patent is extended or adjusted under 35 U.S.C. 154(b) by 0 days.

(21) Appl. No.: 15/142,132

(22) Filed: Apr. 29, 2016

(65) Prior Publication Data
US 2016/0321113 A1    Nov. 3, 2016

(30) Foreign Application Priority Data
Apr. 30, 2015   (EP) .................................... 15305668

(51) Int. Cl.
G06F 9/455        (2018.01)
G06F 9/50         (2006.01)
G06F 9/48         (2006.01)

(52) U.S. Cl.
CPC ........ G06F 9/5077 (2013.01); G06F 9/45533 (2013.01); G06F 9/45558 (2013.01); G06F 9/4856 (2013.01)

(58) Field of Classification Search
CPC .................................................. G06F 9/45533
(Continued)

(56) References Cited

U.S. PATENT DOCUMENTS 7,111,146 B1 *   9/2006   Anvin ................. G06F 12/1036
                                                          711/144
9,262,197 B2 *   2/2016   Chawla ............... G06F 9/45558
(Continued)

FOREIGN PATENT DOCUMENTS

WO        2015042684 A1    4/2015

OTHER PUBLICATIONS

Paul M. Stillwell Jr. et al. "HiPPAI: High Performance Portable Accelerator Interface for SoCs," IEEE Jul. 2009, pp. 1-10 978-1-4244-4921—Jul. 2009, pp. 1-10.
(Continued)

*Primary Examiner* — Mehran Kamran
(74) *Attorney, Agent, or Firm* — The Noblitt Group, PLLC (57) ABSTRACT

The invention concerns a processing system comprising: a compute node (20) having one or more processors and one or more memory devices storing software enabling virtual computing resources and virtual memory to be assigned to support a plurality of virtual machines (VM1); a reconfigurable circuit (301) comprising a dynamically reconfigurable portion (302) comprising one or more partitions (304) that are reconfigurable during runtime and implement at least one hardware accelerator (ACC #1 to #N) assigned to at least one of the plurality of virtual machines (VM); and a virtualization manager (306) providing an interface between the at least one hardware accelerator (ACC #1 to #N) and the compute node (202) and comprising a circuit (406) adapted to translate, for the at least one hardware accelerator, virtual memory addresses into corresponding physical memory addresses to permit communication between the one or more hardware accelerators and the plurality of virtual machines.

13 Claims, 4 Drawing Sheets

(58) Field of Classification Search
USPC .......................................................... 718/1
See application file for complete search history.

(56) References Cited

U.S. PATENT DOCUMENTS

| | | | | |
|---|---|---|---|---|
| 2006/0101427 A1* | 5/2006 | Yamada | ............. | G06F 9/30174 717/136 |
| 2009/0216958 A1* | 8/2009 | Biles | ................... | G06F 13/1668 711/148 |
| 2012/0124588 A1* | 5/2012 | Sinha | .................... | G06F 9/5044 718/102 |
| 2013/0019213 A1* | 1/2013 | Panofsky | ............ | G06F 17/5054 716/101 |
| 2013/0152099 A1* | 6/2013 | Bass | .................... | G06F 9/5027 718/103 |
| 2014/0007098 A1* | 1/2014 | Stillwell, Jr. | ....... | G06F 9/30003 718/1 |
| 2014/0344815 A1* | 11/2014 | Ginzburg | ................ | G06F 9/461 718/101 |
| 2015/0052325 A1* | 2/2015 | Persson | .............. | G06F 12/1458 711/163 |
| 2015/0089495 A1* | 3/2015 | Persson | ............... | G06F 9/45558 718/1 |
| 2015/0205629 A1* | 7/2015 | Kruglick | ............. | G06F 9/45558 718/1 |
| 2015/0293776 A1* | 10/2015 | Persson | ............... | G06F 9/45558 718/1 |
| 2016/0019079 A1* | 1/2016 | Chawla | ............... | G06F 9/45558 710/308 |
| 2016/0321176 A1* | 11/2016 | Yoo | ...................... | G06F 12/0811 |
| 2017/0153977 A1* | 6/2017 | Yoo | ...................... | G06F 12/0811 |
| 2017/0237672 A1* | 8/2017 | Dalal | .................. | H04L 47/2441 370/235 |

OTHER PUBLICATIONS

Miljan Vuletic et al., "Programming Transparency and Portable Hardware Interfacing: Towards General-Purpose Reconfigurable Computing," Proceedings of the 15th IEEE Intl. Conf. on Application-Specific Systems, Architectures and Processors, 2004.

Pham et al., "Microkernel Hypervisor for a Hybrid ARM-FPGA Platform," 2013 IEEE, pp. 219-226.

Kalte et al., "Context Saving and Restoring for Multitasking in Reconfigurable Systems," 2005 IEEE, pp. 223-228.

* cited by examiner

VIRTUALIZATION MANAGER FOR RECONFIGURABLE HARDWARE ACCELERATORS

CROSS-REFERENCES TO RELATED APPLICATIONS

This application claims the benefit of European Patent Application No. 15305668.4, filed Apr. 30, 2015, and incorporates the disclosure of the application by reference.

The work leading to this invention has received funding from the European Union Seventh Framework Programme FP7/2007-2013 and Horizon 2020 Programme H2020/2014-2020 under the grant agreements n°318036 (TRESCCA), n°645119 (TAPPS) and n°761557 (NGPaaS).

FIELD

The present disclosure relates to the field of computing systems, and in particular to a computing system comprising virtual machines and a reconfigurable circuit.

BACKGROUND OF THE TECHNOLOGY

Design approaches known as Cloud Computing, High Performance Computing, and Network Functions Virtualization, among others, employ a virtualization technique whereby processing and memory resources of a compute node are shared between several "virtual machines", for example running in mixed criticality systems in which there is a need to guarantee a certain Quality of Service (QoS), such as latency, bandwidth, etc., privileging some services with respect to others. A compute node is a combination of hardware resources, including one or more processing devices, memory and networking circuits, as well as a software module known as a hypervisor. The hypervisor is used to support a plurality of virtual machines, each virtual machine for example being associated with a different operating system. A compute node provides a single execution environment in which more than one virtual machine may be executed. Such virtualization leads to advantages in terms of cost due to the sharing of hardware resources.

For many applications it is desirable that, in addition to the processing resources available in the compute node, one or more of the virtual machines may make use of hardware accelerators for performing certain functions. For example, for certain video processing operations such as video encoding or decoding, hardware implementations are able to provide faster processing times than software implementations.

It would be desirable to provide a solution in which the hardware resources implementing one or more hardware accelerators may be shared by several virtual machines in order to meet their particular needs. However, there are technical problems in implementing such a solution.

SUMMARY OF THE TECHNOLOGY

It is an aim of embodiments of the present disclosure to at least partially address one or more problems in the prior art.

According to one aspect, there is provided a processing system comprising: a compute node having one or more processors and one or more memory devices, the one or more memory devices storing software enabling virtual computing resources and virtual memory to be assigned to support a plurality of virtual machines; a reconfigurable circuit comprising a dynamically reconfigurable portion comprising one or more partitions that are reconfigurable during runtime of the reconfigurable circuit, the one or more partitions implementing at least one hardware accelerator, each hardware accelerator being assigned to at least one of the plurality of virtual machines; and a virtualization manager providing an interface between the at least one hardware accelerator and the compute node, the virtualization manager comprising an address translation circuit adapted to translate, for the at least one hardware accelerator, virtual memory addresses into corresponding physical memory addresses to permit communication between the one or more hardware accelerators and the plurality of virtual machines.

According to one embodiment, the address translation circuit comprises a translation lookaside buffer.

According to one embodiment, the virtualization manager further comprises a partition table storing partitioning data indicating the assignment of each hardware accelerator to one or more of the plurality of virtual machines.

According to one embodiment, the reconfigurable circuit further comprises a static portion that is not reconfigurable during runtime of the reconfigurable circuit, the system further comprising an interface module implemented in the static portion and coupling the virtualization manager to the at least one hardware accelerator.

According to one embodiment, the virtualization manager is a circuit coupled between the reconfigurable circuit and a system bus of the processing system.

According to one embodiment, the virtualization manager is a circuit implemented within the static portion of the reconfigurable circuit.

According to one embodiment, the virtualization manager is controllable, for example by a hypervisor of the compute node and/or by one or more of the virtual machines, to dynamically reconfigure one or more of the partitions in order to adapt its hardware design to the needs of one or more of the virtual machines.

According to one embodiment, a hypervisor of the compute node is configured to pass commands from the virtual machines to a buffer of the virtualization manager.

According to one embodiment, the virtualization manager is adapted to save a context of one or more of the hardware accelerators to memory to permit another virtual machine to make use of the one or more hardware accelerators.

According to one embodiment, the virtualization manager further comprises a processing circuit adapted to receive commands from the hypervisor and to update the partitioning data stored by the FPGA partition table.

According to one embodiment, the processing circuit is adapted to perform one or more of: configuring or reconfiguring one of the partitions; configuring or reconfiguring a hardware accelerator in one of the partitions; saving the context of a partition to memory; loading the context of a partition from memory; and migrating an accelerator to another compute node.

According to a further aspect, there is provided a method of providing hardware acceleration for at least one virtual machine of a processing system comprising a compute node having one or more processors and one or more memory devices, the one or more memory devices storing software enabling virtual computing resources and virtual memory to be assigned to support a plurality of virtual machines; and a reconfigurable circuit comprising a dynamic portion that is reconfigurable during runtime of the reconfigurable circuit, the dynamic portion implementing at least one hardware accelerator, each hardware accelerator being assigned to at least one of the plurality of virtual machines, the method comprising: translating for the at least one hardware accelerator, by an address translation circuit of a virtualization manager, virtual memory addresses into corresponding physical memory addresses, wherein the virtualization manager provides an interface between the at least one hardware accelerator and the compute node.

According to one embodiment, the hypervisor of the compute node is adapted to instruct the virtualization manager to assign one or said partitions to one of the virtual machines by updating a partition table indicating the assignment of each hardware accelerator to one or more of the plurality of virtual machines.

According to one embodiment, the method further comprises sharing a hardware accelerator by first and second virtual machines of the plurality of virtual machines by instructing the virtualization manager to store a context of the hardware accelerator for a current computation associated with the first virtual machine and to load a context of the hardware accelerator for a computation associated with the second virtual machine, wherein at least one of the virtual machines is associated with a priority level, and the virtualization manager is configured to execute a scheduler program for prioritizing requests from virtual machine to use the hardware accelerator based on said priority level.

According to one embodiment, the method further comprises: migrating to another compute node one of the virtual machines assigned one of the hardware accelerators by instructing the virtualization manager to save the context of the assigned hardware accelerator to a memory accessible by the other compute node.

According to a further aspect, there is provided a storage medium storing computer instructions that, when executed by a processing device, cause the above method to be implemented.

BRIEF DESCRIPTION OF THE DRAWINGS

The foregoing and other features and advantages will become apparent from the following detailed description of embodiments, given by way of illustration and not limitation with reference to the accompanying drawings, in which.

DETAILED DESCRIPTION

In the following description, examples are described in the case of a reconfigurable circuit implemented by an FPGA (field programmable gate array). However, it will be apparent to those skilled in the art that the embodiments described herein could be adapted to other types of reconfigurable circuits.

Figure 1:
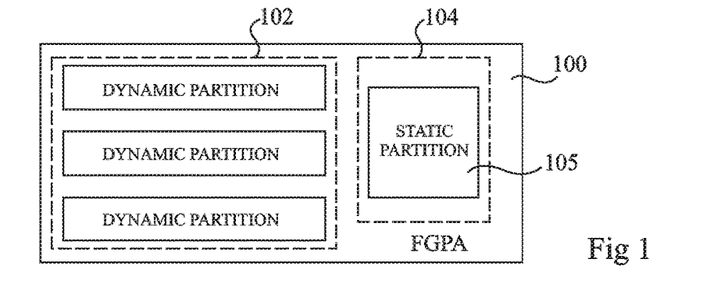
FIG. 1 schematically illustrates an FPGA device according to an example embodiment.

FIG. 1 illustrates an FPGA device 100. An FPGA is a device that can be reconfigured by a configuration file to implement a certain hardware design after manufacture, hence the designation "field-programmable". The configuration file is generally a bit file generated based on code in a hardware description language (HDL), such as Verilog or VHDL, describing the hardware design to be implemented.

FPGAs include programmable logic components known as "logic blocks", which can be configured to implement relatively simple logic gates, such as AND and XOR gates, or more complex combinational functions. The logic blocks often include memory elements such as flip-flops or more complete blocks of memory, for example permitting the implementation of look-up tables (LUTs) or the like.

FPGAs also generally include a hierarchy of reconfigurable interconnects that allow the blocks to be wired together in a desired configuration.

The bit file is for example loaded onto the FPGA each time the FPGA is powered up, and when loaded, configures the interconnects and logics blocks to implement the desired hardware design.

Certain FPGAs permit a partial reconfiguration of their hardware design during runtime of the FPGA. The runtime of the FPGA corresponds to the period following power up and after initial configuration of the FPGA during which at least one portion of the FPGA is active. With reference to FIG. 1, the FPGA device 100 comprises a dynamically reconfigurable portion 102, comprising partitions which can be reconfigured by a partial bit file without compromising the integrity of operations being performed by other parts of the FPGA design. This permits the hardware of the FPGA to be adapted to a particular requirement during runtime, for example allowing the hardware to be time-multiplexed between performing several functions.

In the example of FIG. 1, the dynamically reconfigurable portion 102 is divided into three partitions, each of which is for example capable of being reconfigured during runtime independently of the others in order to implement a certain hardware design. In alternative embodiments, there could be a different number of dynamically reconfigurable partitions, the number depending for example on the particular FGPA device and on the size of the partitions.

The FPGA device 100 also includes a static reconfigurable portion 104 comprising a static partition 105. This partition for example corresponds to a portion of the circuit that is configured by the configuration bit file upon power up of the FPGA, but which is not dynamically reconfigurable during the runtime of the FPGA. The static portion 104 of the FPGA device 100 for example implements features of the circuit that should not change during runtime, such as the input and output ports.

Figure 2:
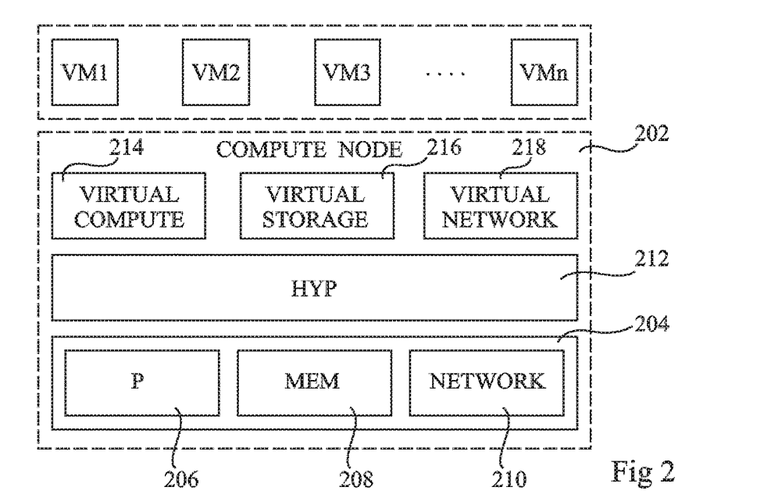
FIG. 2 schematically illustrates a compute node supporting a plurality of virtual machines according to an example embodiment.

FIG. 2 illustrates a compute node 202 supporting a plurality of virtual machines VM1 to VMn according to an example embodiment. As illustrated, the compute node 202 for example comprises hardware components 204, including one or more processors 206, memory devices 208, and networking circuits 210. Furthermore, the memory devices 208 for example store software including an operating system providing a hypervisor 212, which supports and enables the virtual machines to execute. Indeed, the hypervisor 212 for example supports a virtual compute module 214, which assigns processing functions to the virtual machines, a virtual storage module 216, which assigns memory space to the virtual machines, and a virtual network module 218, which enables the virtual machines to access the network hardware 210.

It would be desirable to permit the virtual machines supported by the compute node 202 of FIG. 2 to make use of an FPGA device like the one of FIG. 1 to provide the virtual machines with dynamically reconfigurable hardware acceleration functions. However, there is a technical problem in implementing such a solution. In particular, while one solution might involve modifying the software of the hypervisor 212 so that it can act as an interface between the virtual machines and an FPGA device, such a modification would significantly slow the operation of the hypervisor 212.

Figure 3:
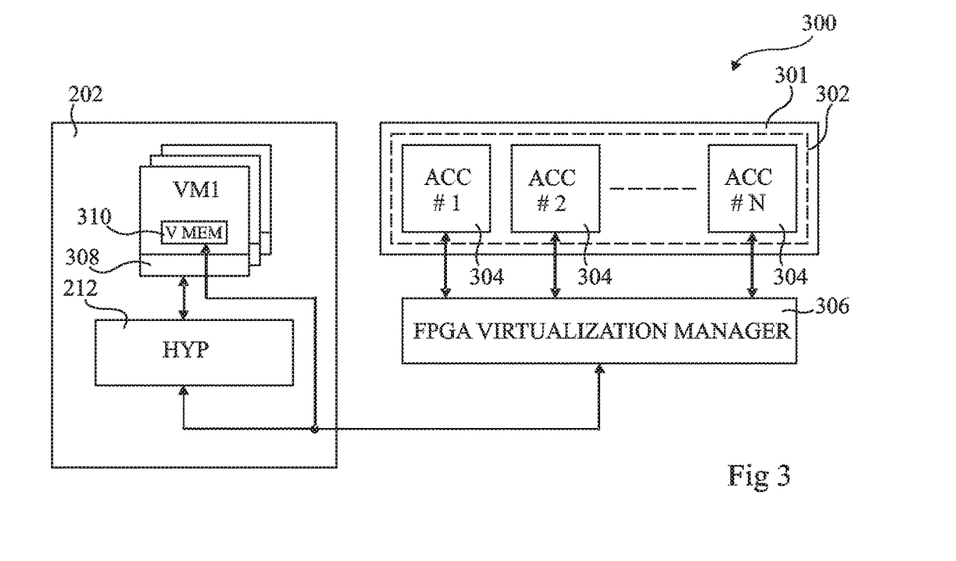
FIG. 3 schematically illustrates a virtualized processing system according to an example embodiment of the present disclosure.

FIG. 3 schematically illustrates a virtualized processing system 300 according to an example embodiment. The system 300 comprises the compute node 202 implementing a plurality of virtual machines, and comprising the hypervisor 212. The system 300 further comprises a reconfigurable circuit 301, which is for example an FPGA device such as the device 100 of FIG. 1, comprising a dynamically reconfigurable portion 302 comprising N partitions 304.

The N dynamically reconfigurable partitions 304 of the circuit 301 implement hardware accelerators ACC #1 to ACC #N respectively. The term "hardware accelerator" as used herein designates any circuit implemented in hardware. For example, a hardware accelerator may implement a function in hardware that would be slower to execute in software. Thus the hardware accelerator "accelerates" processing of the given function. While in the example of FIG. 3 there are N hardware accelerators, where N is equal to 3 or more, in alternative embodiments there could be just 1 or any plurality of hardware accelerators. Furthermore, there could be less hardware accelerators than there are partitions 304, implying the presence of one or more free partitions 304.

Each of the hardware accelerators ACC #1 to ACC #N communicates with the compute node 202 via a module 306 that will be referred to herein as an FPGA virtualization manager. The FPGA virtualization manager 306 is for example coupled to each hardware accelerator ACC #1 to ACC #N. Furthermore, the FPGA virtualization manager 306 also for example communicates with the hypervisor 212, which in turn communicates with the virtual machines VM1 to VMn. In particular, each of the virtual machines for example comprises a software module, provided for example by the hypervisor 212, implementing one or more virtual accelerator interfaces 308 that manage the interface between the virtual machine and a hardware accelerator via the hypervisor 212 and the FPGA virtualization manager 306. This communications link is for example used for transmitting commands between the virtual machines and the virtualization manager and/or the hardware accelerator. Furthermore, the FPGA virtualization manager 306 is for example capable of communicating directly with memory 310 assigned to one or more of the virtual machines in order to communicate data between the virtual machines and the hardware accelerators, such as input parameters for the computations to be performed by the hardware accelerators, and the results of the computations.

The FPGA virtualization manager 306 is for example implemented in hardware, either as a circuit separate from the FPGA 301, or within a static portion of the FPGA. In alternative embodiments, the FPGA virtualization manager 306 could be partially implemented in software executed by the compute node 202.

In operation, the hardware accelerators provided by the dynamically reconfigurable partitions 304 are each assigned to one or more of the virtual machines in order to provide hardware acceleration resources to these virtual machines. Furthermore, in some embodiments, the hypervisor 212 and/or one or more of the virtual machines is configured to control the virtualization manager 306 to dynamically reconfigure one or more of the partitions 304 in order to adapt its hardware design to the needs of one or more of the virtual machines. The FPGA virtualization manager 306 for example manages the assignment of the partitions to the virtual machines, and also enables communication between these components.

Furthermore, the FPGA virtualization manager 306 is for example adapted to implement time-sharing of one or more of the hardware accelerators. For example, if two or more virtual machines wish to access a same hardware accelerated function, and there are no free partitions 304 in the dynamically reconfigurable portion of the FPGA, the virtualization manager 306 is for example configured to implement time-sharing. To do this, the virtualization manager 306 for example maintains, in its internal memory, the context of the accelerator for each of the virtual machines, and multiplexes the requests from each virtual machine to the accelerator. The context of an accelerator corresponds to the information needed to resume the working state of the accelerator, including the bit file for configuring the partition, any defined input parameters of the accelerator or operation modes for the given virtual machine, etc.

In some embodiments, the FPGA virtualization manager 306 is also adapted to support virtual machine migration from one compute node to another. For example, VM migration between different host machines is a technique used to prevent problems due to hardware failures or the availability of physical resources, such as memory or CPU time. For example, the FPGA virtualization manager 306 is capable of saving to memory, and if required, restoring from memory, the context of a partition of the FPGA. This for example permits a virtual machine to be migrated with its entire status, including the context of its assigned hardware accelerator(s). For example, to perform such a migration, the hypervisor 212 programs the virtualization manager 306 to save to memory the context of the one or more accelerators assigned to the virtual machine that is the subject of migration. The hypervisor of the destination compute node is then able to restore the context of the one or more accelerators by programming its FPGA virtualization manager based on the saved context. The migration process is for example transparent to the virtual machine being migrated.

Operation of the virtualization manager 306 will now be described in more detail with reference to FIGS. 4A and 4B.

Figure 4A:
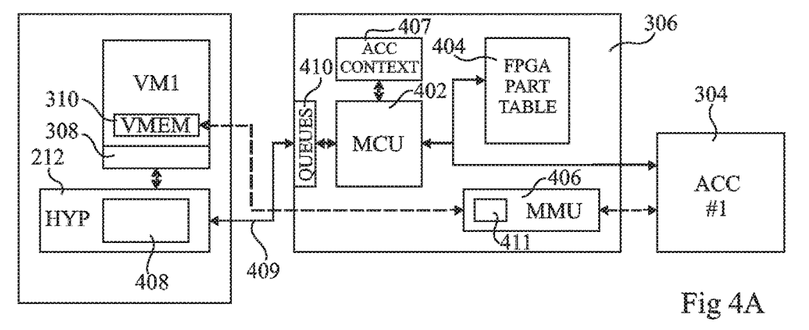
FIG. 4A schematically illustrates an FPGA virtualization manager of the processing system of FIG. 3 according to an example embodiment.

FIG. 4A schematically illustrates part of the virtualized processing system 300, and in particular the FPGA virtualization manager 306, in more detail.

The FPGA virtualization manager 306 for example comprises a micro controller unit (MCU) 402, an FPGA partition table 404, and a memory management unit (MMU) 406.

The MCU 402 is a processing device that implements control functions, for example for enabling partitions to be initialized, configured or reconfigured, time-shared, migrated, etc. The MCU for example communicates with memory 407, within the virtualization manager 306, storing accelerator context data, which is for example used during time-sharing and migration as described above. Solid-line arrows in FIG. 4A represent communications between the MCU 402 and other components of the system that relate to control functions, and form part of a control plane of the system. In particular, the MCU 402 is for example capable of communicating with each of the dynamically reconfigurable partitions 304, one of which is illustrated in FIG. 4A. Furthermore, the MCU 402 is capable of communication with the hypervisor 212 of the compute node 202, and in particular with an FPGA virtual manager backend module 408 of the hypervisor 212, via a link 409. For example, the link 409 is coupled to a buffer 410 in the virtualization manager, the MCU 402 storing queues of messages to be communicated between the MCU 402 and the virtual machines. The module 408 is a software module for enabling FPGA virtualization functions, as will be described in more detail below. The MCU 402 also for example communicates with the FPGA partition table 404. This table stores a listing of the FPGA partitions 304 of the dynamically reconfigurable portion 302 of the FPGA device 301, and also an indication of the virtual machine or machines to which each partition 304 is assigned.

The MCU 402 is for example capable of receiving at least some of the following commands from the hypervisor 212:

Attach partition: this command assigns a partition to one or more of the virtual machines;

Detach partition: this command frees a partition from being assigned to one or more of the virtual machines;

Attach accelerator: this command is for example used when time sharing and QoS functionalities are enabled. This command is for example used by the hypervisor to bind a virtual machine to an accelerator. The command for example comprises a parameter indicating how binding is to be implemented, e.g. the accelerator is dedicated to a VM or time shared. For example, the parameter indicates the QoS level, which could for example indicate the priority level of the VM in case of time sharing, or whether exclusive access to the accelerator is requested;

Re/Configure partition: this command initializes and configures or reconfigures a partition, and for example defines the boundaries, in other words the size, of the partition and its resource usage, such as its number of look up tables, the amount of BRAM (Block Random Access Memory) and the inputs/outputs of the partition to be coupled to the static partition;

Re/Configure accelerator: this command defines the functionality to be implemented by a partition for one or more virtual machines. This for example involves downloading a bit file to the specific dynamically reconfigurable partition;

Save partition context to memory: this command permits the context of a partition during runtime to be stored to a memory, such as the memory 407, permitting the use of a hardware accelerator implemented by one partition to be migrated or shared between more than one virtual machine;

Load partition context from memory: this command permits the previously saved context of a partition to be loaded back, for example from the memory 407, to the partition;

Migrate: this command permits migration of a bit file defining an accelerator from one partition of the FPGA to another partition in the same FPGA or to a partition in another FPGA. Such a migration is for example performed in the case that a virtual machine is migrated from one compute node to another compute node;

Send command to accelerator: the MCU for example controls when each hardware accelerator is triggered to start and stop a computation, for example using "start computation" and "stop computation" commands respectively.

The MMU 406 supports the data communications between the reconfigurable partitions 304 of the FPGA device 301 and the virtual machines. All such data communications are made along a data plane represented by dashed-line arrows in FIG. 4A, and do not involve the MCU 402. The MMU 406 for example comprises a translation lookaside buffer (TLB) 411 storing an indication of the physical addresses in the compute node to be used for communication with each virtual machine, so that it can provide address translation enabling communications between the hardware accelerators of the reconfigurable partitions 304 and the virtual machines. In the case that an address translation is not present in the TLB, the MMU is also for example capable of performing page walk-through in order to determine the address translation.

While in the present disclosure the MMU 406 is described as comprising a TLB and page traversal capabilities, in alternative embodiments, other types of address translation circuit could be provided, for example comprising only a TLB, without page walk-through capabilities.

The address translations to be provided by the MMU 406 are for example programmed via the hypervisor 212 and the MCU 402. Alternatively, the virtual machine may inform the MMU 406 of the memory address from which its page walk table starts.

Figure 4B:
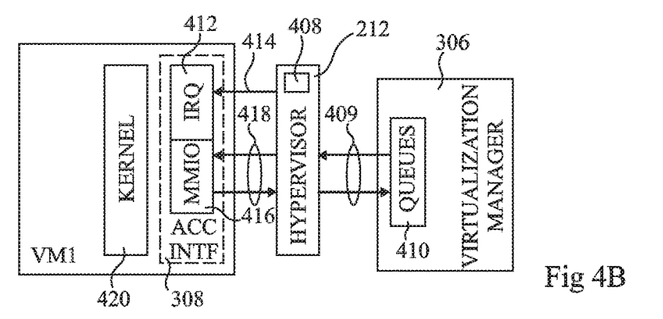
FIG. 4B schematically illustrates an interface between a virtual machine and a virtualization manager of the virtualized processing system of FIG. 3 in more detail according to an example embodiment.

FIG. 4B schematically illustrates the communications link between the FPGA virtualization manager 306 and one of the virtual machines VM1, and illustrates a virtual accelerator interface 308 in more detail. In one embodiment, a separate virtual accelerator interface 308 is provided for each hardware accelerator. Therefore, if one of the virtual machines has assigned to it a plurality of hardware accelerators, it for example comprises a plurality of virtual accelerator interfaces 308, one for each of its assigned hardware accelerators.

The communication between the FPGA virtualization manager 306 and the virtual machine is for example queue based, two queues per virtual machine being stored in a buffer 410 of the virtualization manager 306, one of the queues being for messages to the virtual machine, and the other for messages from the virtual machine. In the embodiment of FIG. 4B, the virtual accelerator interface 308 comprises two parts, an interrupt request (IRQ) part 412, which communicates with the hypervisor 212 via an IRQ line 414 from the hypervisor 212, and a memory mapped input/output (MMIO) part 416, which communicates with the hypervisor 212 via input/output lines 418, the hypervisor communicating in turn with the buffer 410 of the virtualization manager 306 via input/output lines 409.

The IRQ input line 414 from the hypervisor 212 is used by the hypervisor to notify the virtual machine of an incoming event, such as the end of a computation.

The MMIO 416 permits the virtual machine to communicate with the virtualization manager 306, and in particular for messages to be written to and read from the queues stored in the buffer 410, using a memory address in the address space of the virtual machine that is mapped to the buffer 410. These queues are used by a device driver installed in the operating system of the virtual machine to submit and receive commands to and from an accelerator, via the FPGA virtualization manager 306. For example, the hypervisor 212 traps accesses to the MMIO part 416 in order to physically forward requests to the virtualization manager and receive requests/responses from the virtualization manager, and provide the appropriate emulation of the queues and the IRQ behaviour to the virtual machine.

A kernel 420 of the virtual machine corresponds to a device driver of the accelerator interface 308, which for example enables low level communication between applications and the accelerator interface 308.

Figure 5A:
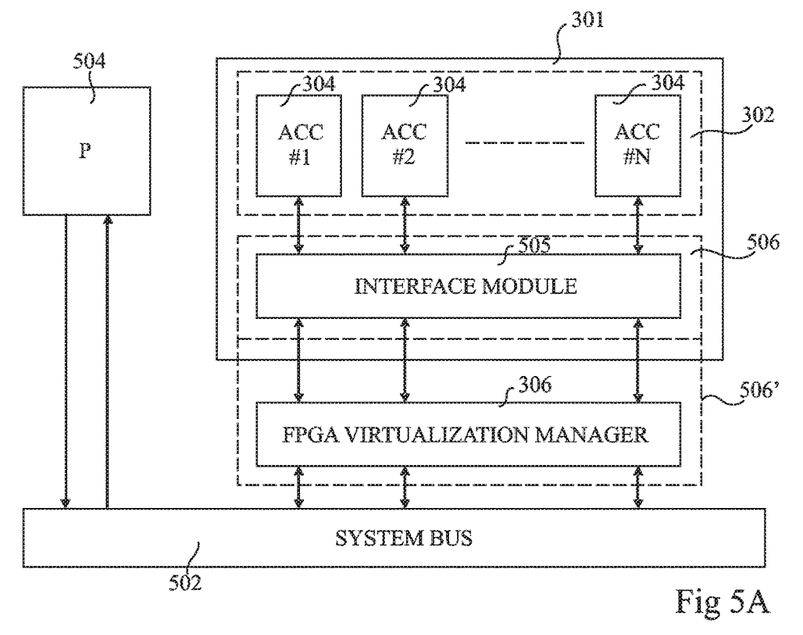
FIG. 5A schematically illustrates hardware in the processing system of FIG. 3 in more detail according to an example embodiment.

FIG. 5A illustrates the hardware implementing the virtualized processing system 300 in more detail according to an example embodiment. The FPGA virtualization manager 306 is for example coupled between the FPGA device 301 and a system bus 502. The one or more processors 504 of the compute node 202, which for example correspond to a central processing unit (CPU), sees in its address space only the FPGA virtualization manager 306 and not the FPGA device 301 directly. Thus it for example can access only the partitions 304 that have been assigned to virtual machines. Furthermore, the processors 504 are thus prevented from directly controlling the FPGA device 301.

In some embodiments, the FPGA device 301 and the processor(s) 504 are on separate integrated circuits. In such a case, the system bus 502 is for example a PCI (peripheral component interconnect) bus interconnecting the integrated circuits. Alternatively, the FPGA device 301 could be a circuit forming part of a system on chip (SoC) with the processor(s) 504. In such a case, the system bus 502 for example corresponds to an SoC interconnect.

As illustrated, each of the accelerators ACC #1 to ACC #N for example communicates with the FPGA virtualization manager 306 via an interface module 505 implemented in the static portion 506 of the FPGA device 301. The module 505 permits the input and output pins of each accelerator 304 to be provided to output pins of the FPGA, and in particular to the FPGA virtualization manager 306. The interface module 505 for example provides a standard interface between accelerators and the virtualization manager 306.

Alternatively, as represented by a dashed box 506' in FIG. 5A, in some embodiments the FPGA virtualization manager 306 is a circuit implemented within the static portion of the FPGA device 301. In such a case, the interface module 505 may form part of the virtualization manager 306.

Figure 5B:
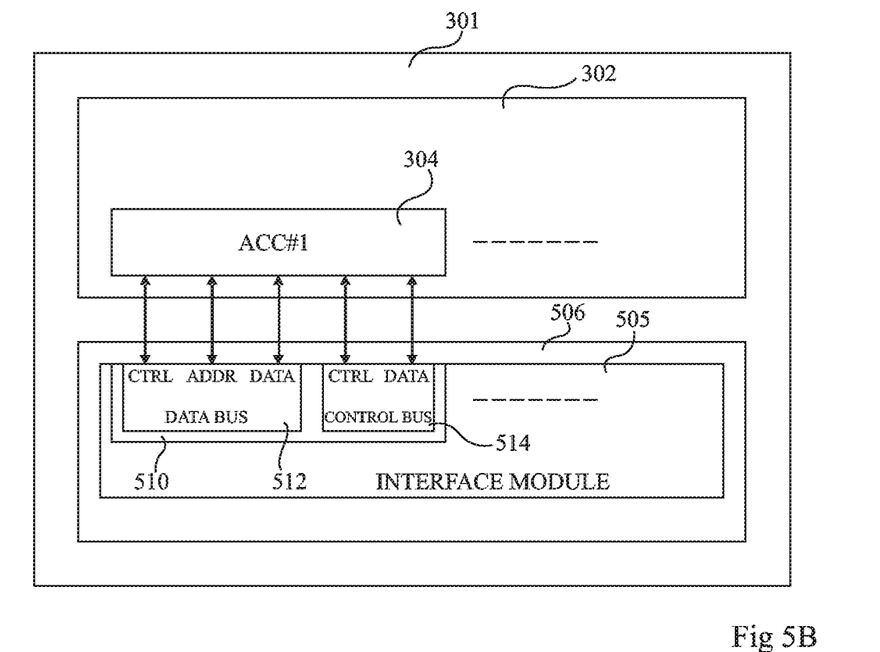
FIG. 5B schematically illustrates an interface module of FIG. 5A in more detail according to an example embodiment.

FIG. 5B schematically illustrates the interface module 505 of the FPGA device 301 in more detail according to an example embodiment.

As illustrated, the interface module 505 for example comprises, for each partition 304 of the dynamically reconfigurable portion 302 of the FPGA device 301, an interface circuit 510 comprising a data bus 512 and a control bus 514. The data bus 512 is used for data accesses in the main memory of the compute node 202. All such data accesses for example pass through the MMU 406, which provides appropriate address translation. The control bus 514 is used for communication between the accelerator and the virtualization manager 306, through the interface module 505. Examples of control messages transmitted via the control bus 514 include:

the initiation by the virtualization manager 306 of a computation to be performed by one of the accelerator;

the resetting of an accelerator requested by the virtualization manager 306, for example in case of error to restart a computation;

transmitting a message by an accelerator to signal the completion of a current task.

In the example illustrated in FIG. 5B, the data bus 512 comprises, in addition to address (ADDR) and data (DATA) lines, a control line (CTRL), which for example transmits REQ and ACK signals to request, by an accelerator, a memory access initiation and for signalling the completion of the memory access by the interface module 505. The address lines provide the address of the memory access, and the data lines provide the data to be read/written from/to memory.

The control bus 514 comprises data (DATA) lines, and also a control line (CTRL) for transmitting REQ and ACK signals. The control line of the control bus 514 is for example bidirectional, since a control transaction may be initiated by either an accelerator of the interface module. The data (DATA) lines are used to indicate the command to be performed, and no address lines are for example provided.

The control signals REQ and ACK are for example single bit signals and thus the control lines CTRL of the data and control buses 512, 514 are each for example 1-bit wide. The width of the data and address lines will depend on the specific memory architecture.

Figure 6A:
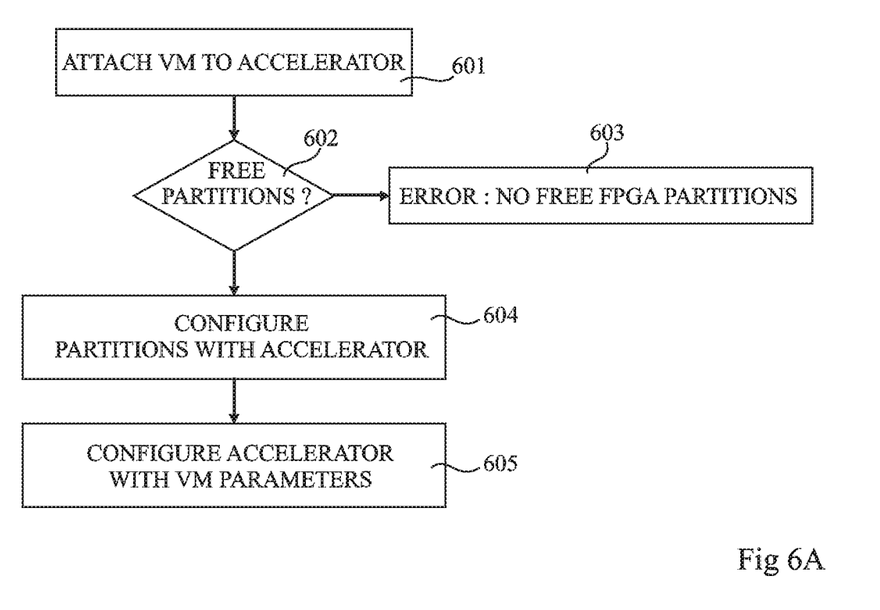
FIG. 6A is a flow diagram illustrating operations in a method of creating, under control of a VM, a hardware accelerator according to an example embodiment.

FIG. 6A is a flow diagram illustrating operations in a method of creating a hardware accelerator for a virtual machine in a VM-driven configuration, according to an example embodiment. In such a configuration, accelerators are for example statically allocated, meaning that time-sharing is not implemented. According to this configuration, the VM programs the FPGA partition via the virtualization manager 306, and directly manages the accelerator allocation, configuration and migration via the virtualization manager 306. The steps of this method are for example executed by the MCU 402 of the virtualization manager 306.

In an operation 601, an attach partition command is for example received by the MCU 402. The attach partition command is for example generated by the virtual machine that is to be attached to an accelerator implemented within the partition.

In an operation 602, the FPGA virtualization manager 306 verifies whether or not there is a free dynamically reconfigurable partition 304 within the FPGA device 301. If not, the next operation is 603, in which an error message is for example generated, indicating to the virtual machine, and optionally to a user, that there is no free FPGA partition. Alternatively, if there is at least one free FPGA partition, the next operation is 604.

In operation 604, if the free FPGA partition 304 has not yet been configured, it is configured by a partial bit file with an accelerator hardware design. For example, the virtual machine generates a configuration partition command, and transmits it to the MCU 402 of the FPGA virtualization manager 306, along with a bit file for configuring the accelerator. Thus, in this case, the virtual machine comprises software and also a hardware implementation of the functionality that is to be accelerated. For example, the accelerator in this case may be a proprietary design.

In an operation 605, the accelerator is configured with parameters set by the virtual machine. For example, the VM transmits to the MCU 402 a configure accelerator command comprising the VM parameters. The manager 306 then for example updates the FPGA partition table 404 to indicate the new assignment of the partition.

Figure 6B:
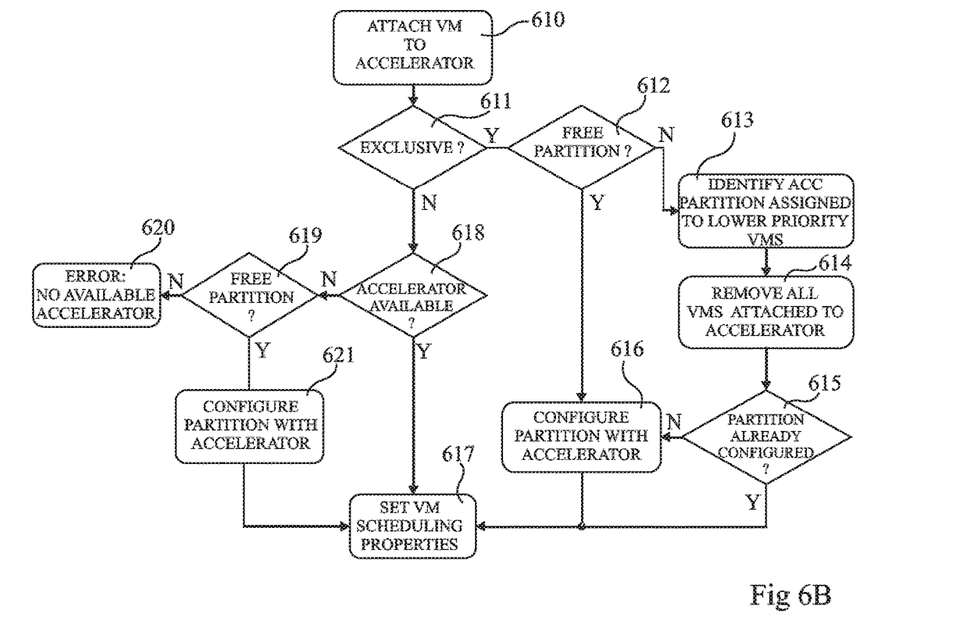
FIG. 6B is a flow diagram illustrating operations in a method of creating, under control of a hypervisor, a hardware accelerator according to a further example embodiment.

FIG. 6B is a flow diagram illustrating operations in a method of creating a hardware accelerator for a virtual machine in a hypervisor-driven configuration, according to an example embodiment. In such a configuration, the hypervisor handles the accelerators for the virtual machines. According to this configuration, QoS time-sharing settings are for example specified. The steps of this method are for example executed by the MCU 402 of the virtualization manager 306, which for example comprises a scheduler program stored in memory associated with the MCU 402 and run by the MCU.

In an operation 610, an attach accelerator command is for example received by the MCU 402. The attach accelerator command is for example generated by the hypervisor on behalf of the virtual machine to which the accelerator is to be attached. The command requests that the virtual manager 306 binds the virtual machine, based on parameters defined in the request, to an accelerator with a set of specific QoS requirements, for example exclusive use of the accelerator, VM priority, etc. Firmware executed by the MCU 402 is for example in charge of implementing a specific scheduling policy according to the QoS requirements of the applications.

In an operation 611, it is determined whether the VM requires exclusive usage of the accelerator. If so, the next operation is 612.

In operation 612, it is determined whether or not there is a free partition. If not, in some embodiments an operation 613 may be performed, in which the execution of lower priority virtual machines is pre-empted to make room for a higher priority virtual machine. Thus in an operation 614, a partition is for example identified, and all of the VMs already attached to it are detached, and a notification is for example sent to the hypervisor to inform the hypervisor that action has been taken. The partition is then assigned to the requesting VM. In an operation 615, it is then determined whether the partition has already been configured with the requested accelerator. If not the next operation is 616. Operation 616 is also for example performed after operation 612 if a free partition is identified.

In operation 616, a configure partition command is generated by the hypervisor in order to load the correct bitstream to the partition. After operation 616, or after operation 615 if the partition has already been configured, the next operation is 617.

In operation 617, the VM scheduling properties are for example set, for example indicating that the VM is to have exclusive use of the accelerator or to configure the VM priority for time-shared scheduling of the accelerator, and the computation by the accelerator can be started. For example, a scheduler program is executed by the MCU and decides, based on the scheduling properties, which accelerator should be executed at any given time. For example, VMs request use of the accelerator, and the scheduler program prioritizes the VM requests in the queue, executing the most privileged first.

If in operation 611 the hypervisor is not requesting that the VM has exclusive access to an accelerator, in an operation 618 it is determined whether the accelerator is already available. If so, the virtualization manager for example adds the VM to the list of VMs time-sharing the accelerator, and operation 617 is for example implemented immediately, to define for example the priority order of the VMs that have access to the accelerator. Alternatively, if the accelerator is not available, the next operation is 619.

In operation 619, it is determined whether there is a free partition. If not, in an operation 620, an error message is for example generated, indicating to the virtual machine, and optionally to a user, that there is no free FPGA partition/accelerator. Alternatively, if a partition is available, in an operation 621 the partition is configured with the correct bitstream, for example by a configure partition command from the hypervisor, and then operation 617 is performed.

It should be noted that the methods of FIGS. 6A and 6B are merely examples, and that many variations to these methods would be possible.

Figure 7:
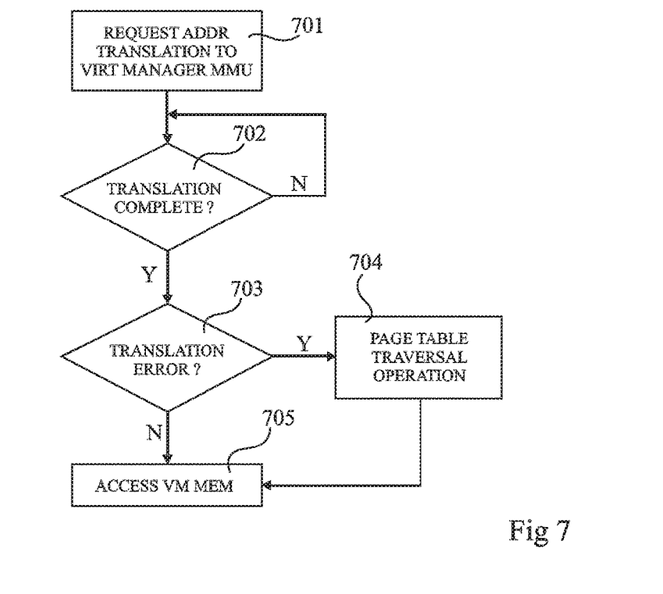
FIG. 7 is a flow diagram illustrating operations in a method of performing address translation according to an example embodiment.

FIG. 7 is a flow diagram illustrating operations in a method of data transfer between a hardware accelerator and a virtual machine, via the MMU 406 of the FPGA virtualization manager 316. In particular, the MMU 406 provides address translation of the virtual address associated with the virtual machine into a physical address in a memory of the compute node 202. Thus, when an accelerator wishes to read data to or write data from a virtual address associated with a virtual machine, the MMU 406 indicates the physical address that should be accessed.

In an operation 701, an accelerator generates a request for address translation, and the request is provided to the MMU 406. The MMU 406 is for example capable of generating, for any virtual address associated with a virtual machine, a physical address in the host, in other words within the compute node 202. In particular, the MMU 406 is capable of translating any virtual address into a physical address that can be used to access the actual memory, by walkthrough of a page table. In some embodiments, the translations that have been generated by the MMU 406 are stored to a cache forming the translation lookaside buffer (TLB), to allow rapid reuse of these translations. Thus, translation is for example initially performed by verifying the presence of the translation in the TLB.

In a subsequent operation 702, it is determined whether or not the translation is complete, or whether a response is otherwise available. If not, operation 702 is repeated until a response is available, and then the next operation is 703.

In operation 703, it is determined whether there was a translation error, for example because the translation was not found in the TLB. In such a case, the page traversal operation is for example started in order to retrieve the translation for the address. Alternatively, if there was no translation error, the next operation is 705, in which the MMU 406 accesses the physical memory address corresponding to the virtual address of the virtual machine and performs the write or read operation at this address as requested by the hardware accelerator.

An advantage of the embodiments described herein is that the virtualization manager 306 permits dynamically reconfigurable partitions of a reconfigurable circuit to be utilized by a plurality of virtual machines. In particular, by providing address translation to the hardware accelerators implemented by the reconfiguration partitions, the physical addresses associated with the virtual addresses of virtual machines can be identified, permitting data to be communicated from the hardware accelerators to the virtual machines rapidly without passing through the hypervisor 212.

Furthermore, by storing in the virtualization manager a partition table indicating the assignment of partitions of the reconfigurable circuit to virtual machines, conflicts between virtual machines wishing to reconfigure the hardware accelerators can be avoided.

Having thus described at least one illustrative embodiment, various alterations, modifications and improvements will readily occur to those skilled in the art.

For example, it will be apparent to those skilled in the art that the various features described in relation to the various embodiments could be combined, in alternative embodiments, in any combination.

The invention claimed is:

1. A processing system comprising:
   a compute node (202) having one or more processors (206, 504) and one or more memory devices (208), the one or more memory devices storing software enabling virtual computing resources (214) and virtual memory (216) to be assigned to support a plurality of virtual machines (VM1 to VMn);
   a reconfigurable circuit (301) comprising a dynamically reconfigurable portion (302) comprising one or more partitions (304) that are reconfigurable during runtime of the reconfigurable circuit (301), the one or more partitions (304) implementing at least one hardware accelerator (ACC #1 to #N), each hardware accelerator being assigned to at least one of the plurality of virtual machines (VM); and
   a virtualization manager (306) providing an interface between the at least one hardware accelerator (ACC #1 to #N) and the compute node (202), the virtualization manager (306) comprising an address translation circuit (406) adapted to translate, for the at least one hardware accelerator (ACC #1 to #N), virtual memory addresses into corresponding physical memory addresses to permit communication between the one or more hardware accelerators and the plurality of virtual machines, wherein the virtualization manager (306) is:
      controllable to dynamically reconfigure one or more of the partitions in order to reconfigure the at least one hardware accelerator based on the needs of one or more of the virtual machines; and
      adapted to save a context of the one or more partitions to memory to permit another virtual machine to make use of the one or more partitions, wherein said context comprises:
         information needed to permit a working state of the hardware accelerator to be resumed, including a bit file for configuring the one or more partitions and input parameters of the hardware accelerator implemented by the one or more partitions, wherein the reconfigurable circuit (502) further comprises a static portion (506) that is not reconfigurable during runtime of the reconfigurable circuit, the system further comprising an interface module (505) implemented in the static portion and coupling the virtualization manager (306) to the at least one hardware accelerator (ACC #1 to #N).

2. The processing system of claim 1, wherein the address translation circuit (406) comprises a translation lookaside buffer (411).

3. The processing system of claim 1, wherein the virtualization manager (306) is a circuit coupled between the reconfigurable circuit (301) and a system bus (502) of the processing system.

4. The processing system of claim 1, wherein the virtualization manager (306) is a circuit implemented within the static portion (506') of the reconfigurable circuit (301).

5. The processing system of claim 1, wherein a hypervisor (212) of the compute node is configured to pass commands from the virtual machines to a buffer (410) of the virtualization manager (306), and wherein the hypervisor (212) and/or one or more of the virtual machines is configured to control the virtualization manager to perform said dynamic reconfiguration.

6. A processing system comprising:
   a compute node (202) having one or more processors (206, 504) and one or more memory devices (208), the one or more memory devices storing software enabling virtual computing resources (214) and virtual memory (216) to be assigned to support a plurality of virtual machines (VM1 to VMn);
   a reconfigurable circuit (301) comprising a dynamically reconfigurable portion (302) comprising one or more partitions (304) that are reconfigurable during runtime of the reconfigurable circuit (301), the one or more partitions (304) implementing at least one hardware accelerator (ACC #1 to #N), each hardware accelerator being assigned to at least one of the plurality of virtual machines (VM); and
   a virtualization manager (306) providing an interface between the at least one hardware accelerator (ACC #1 to #N) and the compute node (202), the virtualization manager (306) comprising an address translation circuit (406) adapted to translate, for the at least one hardware accelerator (ACC #1 to #N), virtual memory addresses into corresponding physical memory addresses to permit communication between the one or more hardware accelerators and the plurality of virtual machines, wherein the virtualization manager (306) is:
      controllable to dynamically reconfigure one or more of the partitions in order to reconfigure the at least one hardware accelerator based on the needs of one or more of the virtual machines; and
      adapted to save a context of the one or more partitions to memory to permit another virtual machine to make use of the one or more partitions, wherein said context comprises:
         information needed to permit a working state of the hardware accelerator to be resumed, including a bit file for configuring the one or more partitions and input parameters of the hardware accelerator implemented by the one or more partitions,
   wherein the virtualization manager (306) further comprises an FPGA partition table (404) storing partitioning data indicating the assignment of each hardware accelerator to one or more of the plurality of virtual machines.

7. The processing system of claim 6, wherein the virtualization manager (306) further comprises a processing circuit (402) adapted to receive commands from a hypervisor (212) and to update the partitioning data stored by the FPGA partition table (404).

8. The processing system of claim 7, wherein the processing circuit (402) is adapted to perform one or more of:
   configuring or reconfiguring one of the partitions; and
   configuring or reconfiguring a hardware accelerator in one of the partitions;
   saving the context of a partition to memory;
   loading the context of a partition from memory; and
   migrating an accelerator to another compute node.

9. A method of providing hardware acceleration for at least one virtual machine of a processing system comprising a compute node (202) having one or more processors (206, 504) and one or more memory devices (208), the one or more memory devices storing software enabling virtual computing resources (214) and virtual memory (216) to be assigned to support a plurality of virtual machines (VM1 to VMn); and a reconfigurable circuit (301) comprising one or more partitions (304) reconfigurable during runtime of the reconfigurable circuit (301), the one or more partitions (304) implementing at least one hardware accelerator (ACC #1 to #N), each hardware accelerator being assigned to at least one of the plurality of virtual machines (VM), the method comprising:
- translating for the at least one hardware accelerator (ACC #1 to #N), by an address translation circuit (406) of a virtualization manager (306), virtual memory addresses into corresponding physical memory addresses, wherein the virtualization manager (306) provides an interface between the at least one hardware accelerator (ACC #1 to #N) and the compute node (202);
- dynamically reconfiguring the one or more partitions (304) in order to reconfigure the at least one hardware accelerator based on the needs of one or more virtual machines; and
- sharing the one or more partitions by first and second virtual machines of the plurality of virtual machines by instructing the virtualization manager (306) to store context of the one or more partitions for a current computation associated with the first virtual machine and to load a context of the one or more partitions for a computation associated with the second virtual machine, wherein said context comprises information needed to permit a working state of the hardware accelerator to be resumed, including a bit file for configuring the one or more partitions and input parameters of the hardware accelerator implemented by the one or more partitions, wherein the reconfigurable circuit (301) further comprises a static portion (506) that is not reconfigurable during runtime of the reconfigurable circuit (301), the system further comprising an interface module (505) implemented in the static portion and coupling the virtualization manager (306) to the at least one hardware accelerator (ACC #1 to #N).

10. The method of claim 9, wherein a hypervisor (212) of the compute node (202) is adapted to instruct the virtualization manager (306) to assign one or said partitions (304) to one of the virtual machines by updating a partition table (404) indicating the assignment of each hardware accelerator to one or more of the plurality of virtual machines.

11. The method of claim 9, wherein at least one of the virtual machines is associated with a priority level, and wherein the virtualization manager (306) is configured to execute a scheduler program for prioritizing, based on said priority level, requests from virtual machines to use the hardware accelerator.

12. The method of claim 9, further comprising: migrating to another compute node one of the virtual machines assigned one of the hardware accelerators by instructing the virtualization manager (306) to save the context of the assigned hardware accelerator to a memory accessible by the other compute node.

13. A storage medium storing computer instructions that, when executed by a processing device, cause the method of claim 9 to be implemented.

* * * * *